US009850952B2

(12) United States Patent
Holsnijders et al.

(10) Patent No.: US 9,850,952 B2
(45) Date of Patent: Dec. 26, 2017

(54) BEARING ASSEMBLY WITH LUBRICATION CARTRIDGE

(71) Applicant: AKTIEBOLAGET SKF, Göteborg (SE)

(72) Inventors: Jos Holsnijders, Leerdam (NL); Maurizio Martinetti, Turin (IT); Filip Rosengren, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 11 days.

(21) Appl. No.: 14/901,724

(22) PCT Filed: Jul. 3, 2013

(86) PCT No.: PCT/EP2013/063984
§ 371 (c)(1),
(2) Date: Dec. 29, 2015

(87) PCT Pub. No.: WO2015/000509
PCT Pub. Date: Jan. 8, 2015

(65) Prior Publication Data
US 2016/0138653 A1 May 19, 2016

(51) Int. Cl.
F16C 19/00 (2006.01)
F16C 33/66 (2006.01)
(Continued)

(52) U.S. Cl.
CPC ........ *F16C 33/6622* (2013.01); *F16C 19/522* (2013.01); *F16C 19/525* (2013.01); *F16C 33/6611* (2013.01); *F16C 33/6625* (2013.01); *F16C 33/6633* (2013.01); *F16C 33/6648* (2013.01); *F16C 19/184* (2013.01); *F16C 19/386* (2013.01)

(58) Field of Classification Search
CPC .............. F16C 33/6611; F16C 33/6625; F16C 33/6633; F16C 2326/43
See application file for complete search history.

(56) References Cited

U.S. PATENT DOCUMENTS 3,424,273 A 1/1969 Carlson et al.
3,493,279 A 2/1970 Warren et al.
(Continued)

FOREIGN PATENT DOCUMENTS

DE 3936529 A1 5/1991
EP 0654613 A1 5/1995
GB 1357175 A 6/1974

*Primary Examiner* — James Pilkington
(74) *Attorney, Agent, or Firm* — Bryan Peckjian; SKF USA Inc. Patent Dept.

(57) ABSTRACT

A bearing assembly comprising a rolling element bearing having a first row of rolling elements arranged in a first bearing cavity between a first inner raceway and a first outer raceway of the bearing, and having a second row of rolling elements arranged in a second bearing cavity between a second inner raceway and a second outer raceway of the bearing. The assembly further comprises an annular grease cartridge arranged between the first and second rows of rolling elements. The annular grease cartridge is at least partly formed from a honeycomb structure having axially extending passageways filled with a grease lubricant, wherein at least some of passageways are open towards the first and second bearing cavities.

15 Claims, 5 Drawing Sheets

(51) Int. Cl.
*F16C 19/52* (2006.01)
*F16C 19/18* (2006.01)
*F16C 19/38* (2006.01)

(56) References Cited

U.S. PATENT DOCUMENTS

| | | |
|---|---|---|
| 3,866,716 A | 2/1975 | Matson |
| 3,913,992 A | 10/1975 | Scott |
| 5,803,616 A | 9/1998 | Persson et al. |
| 2012/0301065 A1* | 11/2012 | Mori .................. F16C 33/6607 384/469 |

* cited by examiner

BEARING ASSEMBLY WITH LUBRICATION CARTRIDGE

CROSS REFERENCE TO RELATED APPLICATION

This is a U.S. National Stage Application claiming the benefit of International Application No. PCT/EP2013/063984 filed on 3 Jul. 2013, which is incorporated herein by reference in its entirety.

FIELD OF THE INVENTION

The present invention relates to a bearing assembly comprising a cartridge at least partly filled with a grease lubricant.

BACKGROUND TO THE INVENTION

A bearing assembly of this kind is known from U.S. Pat. No. 5,803,616, which discloses a double-row taper roller bearing in which a grease retainer is mounted to an outer ring of the bearing between the two rows of tapered rollers, at a small-diameter end of the rollers. In a tapered roller bearing, grease lubricant is urged from the small diameter end of the bearing to a large-diameter end under the action of centrifugal force. Therefore, grease that is initially provided between the two roller sets may migrate relatively quickly to an axially outer side of the bearing, where the grease contributes little to the lubrication of the bearing. As a result, relubrication is required on a regular basis. Furthermore, the migration of the grease from the small diameter end to the large diameter end creates churning losses and friction.

The retainer disclosed in U.S. Pat. No. 5,803,616 has a ring-shaped channel which is axially delimited by two side walls of the retainer. The side walls have apertures for communicating the inner space of the channel with the bearing space. The grease retainer therefore allows some migration of grease to the bearing space but prevents the grease from migrating too quickly, even under the influence of centrifugal forces and shock loads experienced during operation.

The retention of grease between the two sets of rollers in a double-row taper roller therefore has benefits, but it is also important that the retained grease is able to contribute to the lubrication of the bearing, either in terms of grease migration or the migration of oil that bleeds from the grease.

In U.S. Pat. No. 3,913,992, a lubrication apparatus is disclosed, comprising a collar for supporting a mass of grease, mounted on a rotating part of a double-row tapered roller bearing, between the two roller sets. The collar has a support surface that faces the bearing axis of rotation and side walls that form a container for the grease mass. The collar is made of a mesh screen or of sheet with perforations, so that oil is released from the collar under the action of centrifugal force, while the grease body remains in place. The oil provides lubrication to the bearing contacts.

There is still room for improvement, however, in terms of defining a bearing assembly provided with a grease cartridge that enables a more controlled delivery of grease and/or oil during bearing operation.

SUMMARY OF THE INVENTION

The present invention resides in a bearing assembly. Specifically, the present invention provides a bearing assembly comprising a rolling element bearing having a first row of rolling elements arranged in a first bearing cavity between a first inner and a first outer raceway of the bearing, and having a second row of rolling elements arranged in a second bearing cavity between a second inner and a second outer raceway of the bearing. The assembly further comprises an annular grease cartridge arranged between the first and second rows of rolling elements. According to the invention, the annular grease cartridge is at least partly formed from a honeycomb structure having axially extending passageways filled with a grease lubricant, wherein at least some of passageways are open towards the first and second bearing cavities.

The honeycomb structure provides a large surface area for the grease to adhere to, meaning that grease can be retained within the cartridge for a long period. A further advantage of the large surface area is that heat transfer is facilitated. When an oil film that lubricates rolling contact surfaces within the bearing becomes too thin to separate the surfaces, asperity contact takes place, leading to friction and a sharp rise in bearing temperature. In a grease cartridge according to the invention, the temperature rise is quickly transferred from the honeycomb structure to the grease, thereby stimulating thermal bleeding and oil release from the cartridge. The released oil replenishes the oil film, causing bearing temperature to fall. The grease in the axial passageways of the honeycomb structure quickly returns to "normal" temperature and the thermal bleed rate drops correspondingly.

The grease cartridge therefore not only provides a long-lasting grease reservoir in a bearing assembly according to the invention, but is also thermally responsive such that additional lubrication can be provided when it is needed most. In a preferred embodiment, the honeycomb structure and further parts of the cartridge are formed from a metallic material such as aluminum, to enhance the thermal responsiveness of the cartridge In a grease lubricated bearing, the location of the grease also plays an important role. As mentioned, grease that adheres to an axially inner side of a seal contributes almost nothing to bearing lubrication and does not act as a reservoir for supplying base oil to the rolling contacts. By contrast, the underside of bearing cage bars is a particularly important reservoir within a bearing.

Thus, in a further development of the invention, the cartridge is adapted to deliver lubricant to a targeted location within the first and second bearing cavities. Suitably, the annular grease cartridge has a first side wall that faces the first bearing cavity and a second side wall that faces the second bearing cavity. The cartridge further comprises a first axial extension that protrudes from the first side wall towards the first bearing cavity, and a second axial extension that protrudes from the second side wall towards the second bearing cavity. The first and second axial extensions act as a conduit for delivering lubricant that is released from the honeycomb structure to a desired location within the first and second bearing cavities.

In a preferred embodiment, the first and second axial extensions of the cartridge extend below an axially inner portion of a cage that retains the first and second rows of rolling elements. Lubricant released from the openings in the extensions is therefore delivered close to the inner raceway of the first and second inner rings. Furthermore, especially when the inner rings are rotational in use, the released lubricant will be flung onto an underside of the cage.

In a further example, the grease cartridge comprises additional first and second axial extensions that extend towards the first and second bearing cavities, which are arranged above the axially inner portion of the cage. These extensions ensure that lubricant is delivered close to the outer raceways of the bearing.

In one embodiment, the grease cartridge is formed from the honeycomb structure. The structure may comprise several passageways which are radially stacked and whereby each passageway is open at both axial ends. Alternatively, to reduce the amount of lubricant that is released, some of the openings may be closed off towards the first and second bearing cavities. The cartridge then suitably comprises a number of channels that are e.g. drilled though the honeycomb structure, such that passageways which are closed off towards the first and second cavities are in communication with passageways that are open towards the first and second cavities.

In another embodiment, the grease cartridge is formed by a casing, whereby the honeycomb structure is housed within the casing. Suitably, the casing comprises a number of openings towards the first and second bearing cavities to allow lubricant released from the honeycomb structure to be supplied to the bearing cavities.

In a still further embodiment, the axial extensions of the cartridge are formed by the honeycomb structure. The cartridge further comprises an enclosed cavity that may be filled with grease or oil, whereby the cartridge cavity is in communication with the bearing cavities via the first and second axial extensions.

The grease cartridge may be mounted to a rotational part of the bearing assembly or to a non-rotational part. When mounted to a rotational part the cartridge may comprise surfaces that slope away from the bearing axis of rotation, such that a centrifugal force acting on the grease in the cartridge causes the grease or base oil released from the grease to move in an axial direction. The axially extending passageways of the honeycomb structure may be angled in this way. Furthermore, when the cartridge comprises a casing in which the honeycomb structure is housed, the casing may have surfaces angled in this way.

In embodiments where the cartridge is mounted to the non-rotational part of the bearing, the axially extending passageways of the honeycomb structure or other passageways of the cartridge may slope towards the bearing axis of rotations, such that gravity acts on the grease within the cartridge.

The grease that is provided in the grease cartridge is preferably the same as a bearing grease with which the rest of the bearing is lubricated. Additionally or alternatively, the grease cartridge may comprise a second grease. Preferably, the second grease has the same base oil as the bearing grease, to ensure compatibility. The second grease may be stiffer grease than the bearing grease, when it is desired that the grease remains in the honeycomb structures and base oil is released from the cartridge. When it is preferred that the grease is released from the honeycomb structure, the second grease may have a lower stiffness than the bearing grease.

Furthermore, when the cartridge comprises the bearing grease, the release of base oil and/or grease may be controlled by adapting the size of the axial passageways to the rheology of the grease for the application conditions concerned.

Thus, a grease cartridge comprising a honeycomb structure may be used in a variety of ways, so as to improve bearing lubrication and prolong grease life within the bearing. Other advantages will become apparent from the detailed description and accompanying drawings.

DETAILED DESCRIPTION OF THE PRESENT INVENTION

Figure 1A:
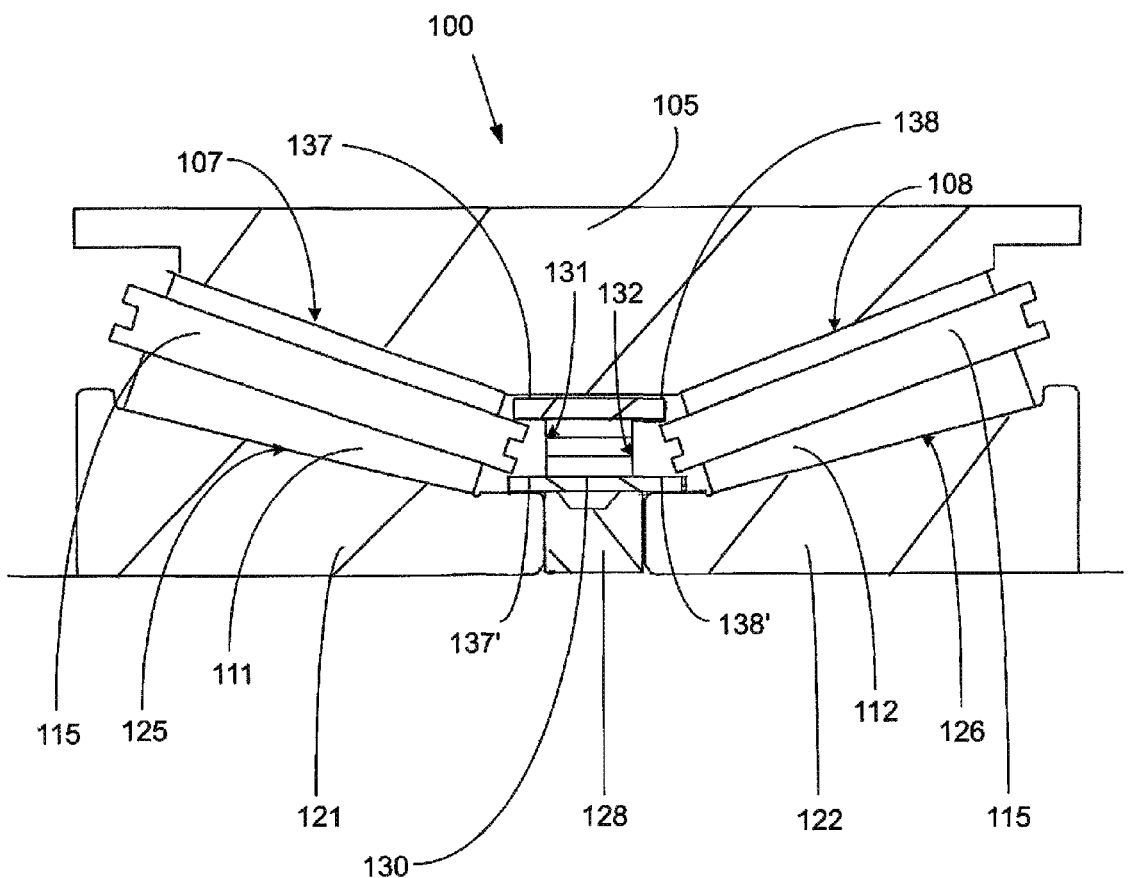
FIG. 1a shows a part cross-sectional view of a first example bearing assembly according to the invention comprising a grease cartridge formed from a honeycomb structure.

An example of a first embodiment of a bearing assembly according to the invention is shown in FIG. 1a. The bearing assembly 100 comprises a double-row taper roller bearing having an outer ring 105 with a first outer raceway 107 for a first set of tapered rollers 111 and a second outer raceway 108 for a second set of tapered rollers 112. Each of the first and second sets of rollers 111, 112 is retained by a cage 115, and the bearing further comprises a first inner ring 121 and a second inner ring 122 having first and second inner raceways 125, 126. A first bearing cavity is defined between the first inner and outer raceways 125, 107 and a second bearing cavity is defined between the second inner and outer raceways 126, 108. The bearing is adapted for inner ring rotation in this example.

The bearing is grease lubricated, whereby a suitable bearing grease is provided between the outer ring 105 and the inner rings 121, 122 in a conventional manner. To provide improved, long-lasting lubrication, the bearing assembly 100 additionally comprises a grease cartridge 130 arranged between the first and second sets of tapered rollers 111, 112.

Figure 1B:
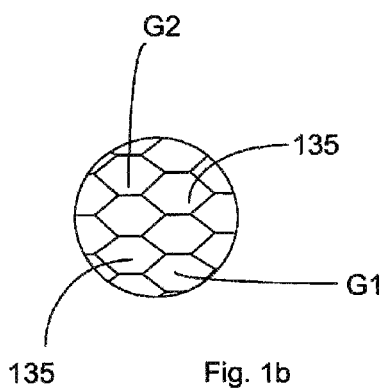
FIG. 1b shows a detail through a cross-section of the honeycomb structure.

The first and second inner rings 121, 122 are axially spaced by means of a spacer ring 128, to which the grease cartridge 130 is mounted. In the depicted example, the spacer ring has a shaped recess and the grease cartridge has a correspondingly shaped base portion that fits into the recess. The grease cartridge 130 has a honeycomb structure comprising axially extending passageways 135 with a geometric cross-section (see FIG. 1b). The honeycomb structure comprises passageways with a hexagonal cross-section in this example, but other geometries are possible; e.g. triangular, diamond shaped, circular. The passageways 135 are filled with a grease lubricant, and are open at the first and second axial sides, for allowing the release of grease or the release of base oil from the grease. The grease in the passageways 135 of the honeycomb structure may be the same bearing grease as is provided in the rest of the bearing assembly. Alternatively, a different grease many be used, but which preferably has the same base oil as the bearing grease, so that compatibility is ensured. In the depicted example, radially inner passageways of the cartridge are filled with a first grease G1, which is the same grease as in the rest of the bearing, and radially outer passageways of the cartridge 130 are filled with a second grease G2, different from the first grease (refer FIG. 1b).

One advantage of retaining grease within a honeycomb structure is that the grease is in contact with a relatively large surface area. The grease therefore has a large surface area to stick to and will not be quickly released through the passageway openings. The large surface area also facilitates heat conduction. Suitably, the honeycomb structure is made of a metallic material such as aluminum. Bearing temperature increases when the bearing operates with insufficient lubrication. This increase in heat is readily transferred to the grease in the honeycomb structure, stimulating oil bleed. The lubricating behaviour of the cartridge 130 is therefore thermally responsive, to facilitate the delivery of lubricant when it is needed most.

In the depicted example, the cartridge 130 is mounted to a rotating part. The grease in the passageways 135 therefore experiences centrifugal force and is pressed against a radially outer side of the passageways. This causes oil to separate from the grease thickener structure. The passageway openings in this example are parallel to the bearing axis of rotation, meaning that there will be no movement of oil or grease through the passageways in an axial direction due to the centrifugal force. At the passageway openings, however, oil and/or grease will inevitably escape due to vibration and shocks.

The release of oil or grease from the passageways 135 depends on factors such as the size of the passageways, the rheology the grease therein, temperature and centrifugal force. For the application in question, the size of the passageways openings is adapted such that the first grease G1 is released from the passageway openings. A grease portion at the axial extremities of a passageway 135 will get "shaken" out of the cartridge due to vibration. Vibration also causes the first grease G1 to creep in an axial direction, meaning that the grease in a central area of the passageways 135 eventually finds its way to the axial extremities of passageways 135, where it will be shaken out to contribute to bearing lubrication.

The second grease G2 is a stiffer grease than the first grease and, for the application in question, is adapted such that base oil from the grease is released from the passageway openings. A grease portion at the openings therefore becomes depleted in oil, i.e. drier. Without being bound by the theory, this drier portion is thought to take up oil from a neighbouring grease portion that has not been depleted, in the manner of a sponge soaking up liquid. The depleted neighbouring portion then soaks up oil from an axially inner neighbouring portion and so on. Thus, drops of oil, which separates due to centrifugal force, are released from the passageways 135, meaning that the bearing is not flooded, but is supplied with regular doses of lubricant. As mentioned, the amount of oil release will increase due to thermal bleeding when bearing temperature increases, which is precisely when more lubrication is needed.

For proper bearing lubrication, it is not only important that lubricant is present, but also that lubricant is present at a location where it can readily contribute to the formation of an oil film that separates the contacting surfaces within the bearing. In a further development, the grease cartridge 130 comprises axial extensions which act as a conduit for delivering lubricant to a desired location within the bearing. In the example of FIG. 1a, the grease cartridge 130 has a first side wall 131 that faces the first bearing cavity and has a second side wall 132 that faces the second bearing cavity. The grease cartridge further comprises first axial extensions 137, 137' that extend from the first side wall 131 towards the first bearing cavity and comprises second axial extensions 138, 138' that extend from the second side wall 132 towards the second bearing cavity. The axial extensions are formed from the passageways 135 of the honeycomb structure, whereby the passageway openings of the axial extensions are arranged just above and just below an axially inner portion of each cage 115.

The radially inner extensions 137' and 138' are filled with the first grease G1, which is adapted to be released from the cartridge. When the first grease exits these extensions, it will be flung out due to centrifugal forces, and then retained under a portion of each cage. As mentioned, the underside of cage bars is a particularly important lubricant reservoir in a bearing. The cartridge is thus adapted to replenish this reservoir. First grease G1 that is released from other passageways of the cartridge 130 will also be flung out, and then retained by an underside of the radially outer axial extensions 137, 138. The underside of these extensions will thus provide an additional reservoir, close to the bearing cage 115. The extended passageways that form the radially outer axial extensions 137 138 are, in this example, filled with the second grease G2, which is adapted to release oil. The released oil will be flung out at a location close to the first and second outer raceways 107, 108 of the bearing, meaning that this oil can contribute almost immediately to replenishing an oil film on the outer raceways. Thus, oil and grease is delivered in a targeted manner to locations within the bearing where the oil and grease can provide effective lubrication.

Figure 2:
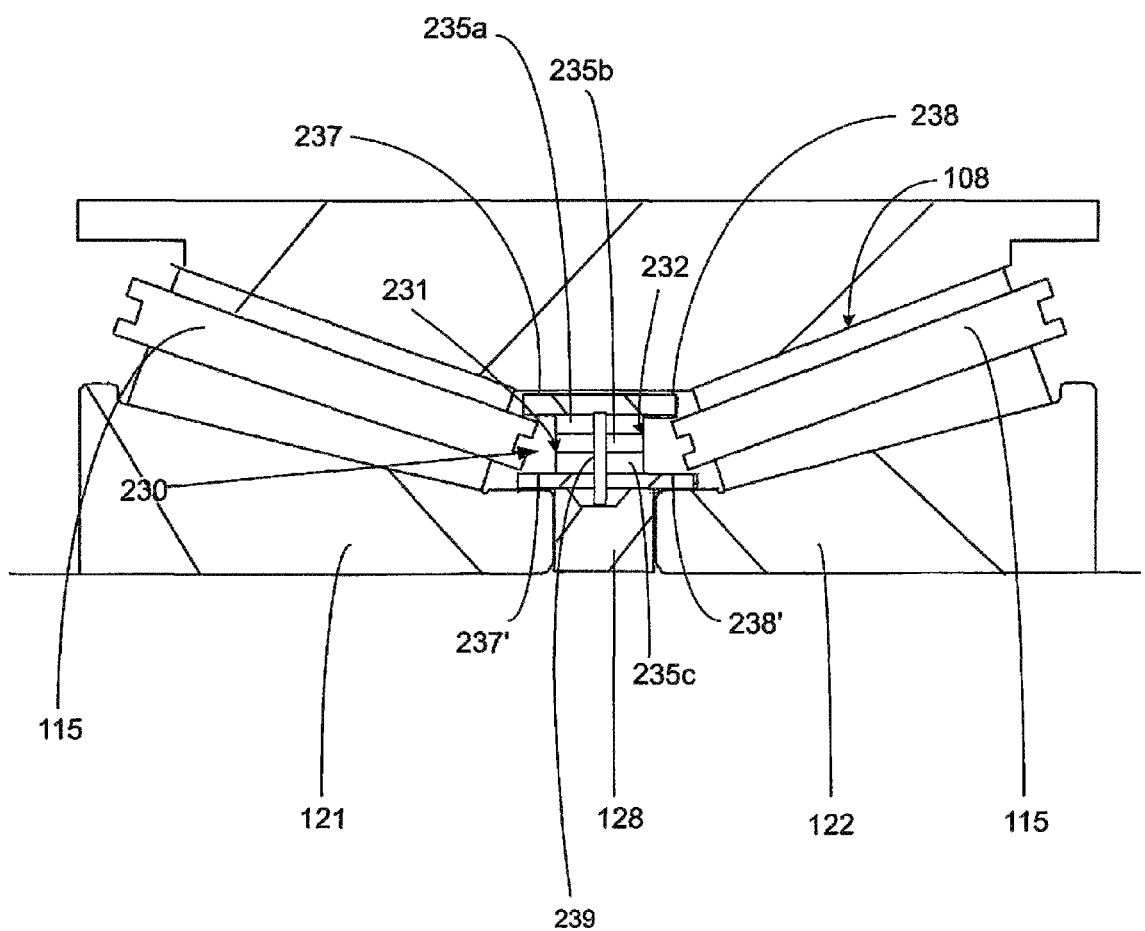
FIG. 2 shows a part cross-sectional view of a second example bearing assembly according to the invention.

The grease cartridge 130 in the example of FIG. 1a is made entirely from the honeycomb material and the first and second side walls 131, 132 comprise openings of axial passageways 135. If for a particular application, such a construction leads to too much base oil or grease being released from the cartridge, the first and second side wall may be fully or partially closed off. For example, the honeycomb structure could be deformed to close off some of the openings, or provided with a cover. An example of such an embodiment is depicted in FIG. 2. The same reference numerals are used to indicate identical components as in FIG. 1a.

In this example, the bearing assembly is provided with a grease cartridge 230 formed from a honeycomb structure having axially extending passageways, whereby the cartridge has a first side wall 231 and a second side wall 232 formed by an annular sheet that closes off passageways 235a, 235b, 235c at the respective first and second axial sides of the cartridge. Again, the cartridge comprises two first 237, 237' and two second 238, 238' axial extensions that extend from the first and second side walls 231, 232 respectively. The cartridge is mounted to the spacer ring 128 that separates the inner rings 121, 122 of the bearing, which are rotational in use. In this example, the bearing cartridge is filled with a single grease, being the same grease as in the rest of the bearing, whereby the size of the passageway openings and the stiffness of the grease are tuned such that base oil is released from the passageways openings under normal operating conditions for the application in question.

The radially inner axial extensions 237', 238' are open at the first and second sides of the cartridge and will release base oil, which gets flung out onto an underside of the cage 115. It is also advantageous to supply base oil at this location. Grease that is retained underneath the cage bars becomes depleted in oil, mainly due to thermal bleeding. The fresh base oil that is supplied from the cartridge 230 via the axial extensions 137', 138 can be absorbed by the grease under the cage bars, thereby extending the lubrication life of this grease reservoir.

In order to enable the grease in the passageways 235a, 235b, 235c that are closed off by the first and second side walls 231, 232 to contribute to the lubrication supply of the cartridge, a number of radially extending channels 239 are e.g. drilled through a central portion of the cartridge 230. The aforementioned passageways are thus provided with axially inner openings that are in communication with the radially outer axial extensions 237, 238 of the cartridge. Base oil will be released at these axially inner openings, in a manner as described above, and will be flung out to the radially outer passageways that form these extensions 237, 238. The base oil will eventually be supplied to the bearing outer raceways 107, 108, via the extensions, 137, 138 in a manner as described above.

Figure 3:
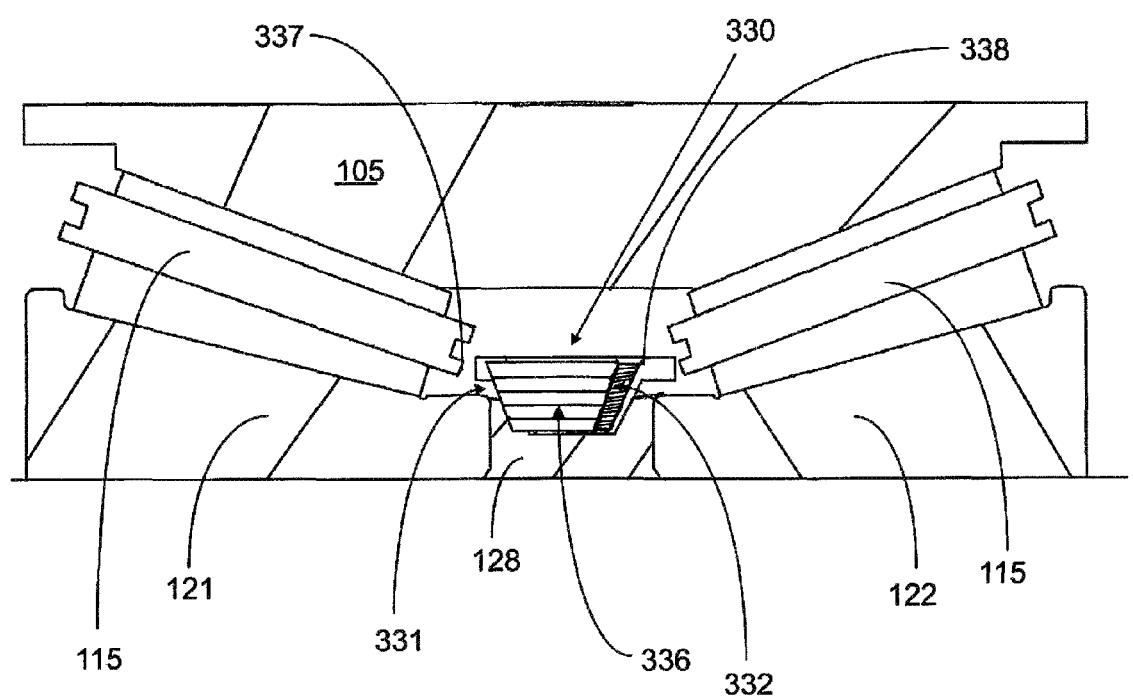
FIG. 3 shows a part cross-sectional view of a third example bearing assembly according to the invention.

In a further embodiment, the cartridge comprises a honeycomb structure for retaining grease that is entirely enclosed within a casing, whereby the casing has apertures for allowing grease and/or oil to be released from the cartridge. An example of such an embodiment is shown in FIG. 3. The bearing assembly 300 in this example is again a double-row taper roller bearing adapted for inner ring rotation comprising a grease cartridge mounted on the spacer ring 128. The grease cartridge 330 comprises a honeycomb retainer 336 formed from honeycomb material, which has axially extending passageways filled with a grease lubricant. The honeycomb retainer 336 is enclosed by a casing having a top wall, a base wall, a first side wall 331 and a second side wall 332. Again, the cartridge comprises a first axial extension 338 that extends from the first side wall 331 towards the first bearing cavity and has a second axial extension 338 that extends from the second side wall towards the second bearing cavity. The first and second axial extensions are arranged at a radially outer side of the cartridge 330 and comprise openings arranged above the first and second inner rings 121, 122 and just below an axially inner portion of each cage 115.

The cartridge 330 has a first channel between the first side wall 331 and the openings in the honeycomb passageways that face this side wall and has a second channel between the second side wall 332 and the passageway openings that face this side wall 332. The first and second channels are respectively in communication with the first and second side axial extension 337, 338 for allowing the delivery of lubricant to the bearing cavities.

In this example, lubricant that is released from the axial passageways openings will accumulate in the casing of the grease cartridge 330. The first and second side walls of the cartridge slope outwardly, meaning that a tangential component of the centrifugal force acting on the rotating grease cartridge will cause the released lubricant to move to the first and second axial extensions 337, 338. Suitably, the first and second axial extension have openings which are adapted in size, shape and number to control the amount of lubricant that is delivered. In this example, lubricant release from the grease cartridge 330 will initially drop onto the rotating first and second inner rings. It will then most likely be flung onto the bearing cage 115 which, as mentioned, is an optimal location for supplying grease and/or oil.

Figure 4A:
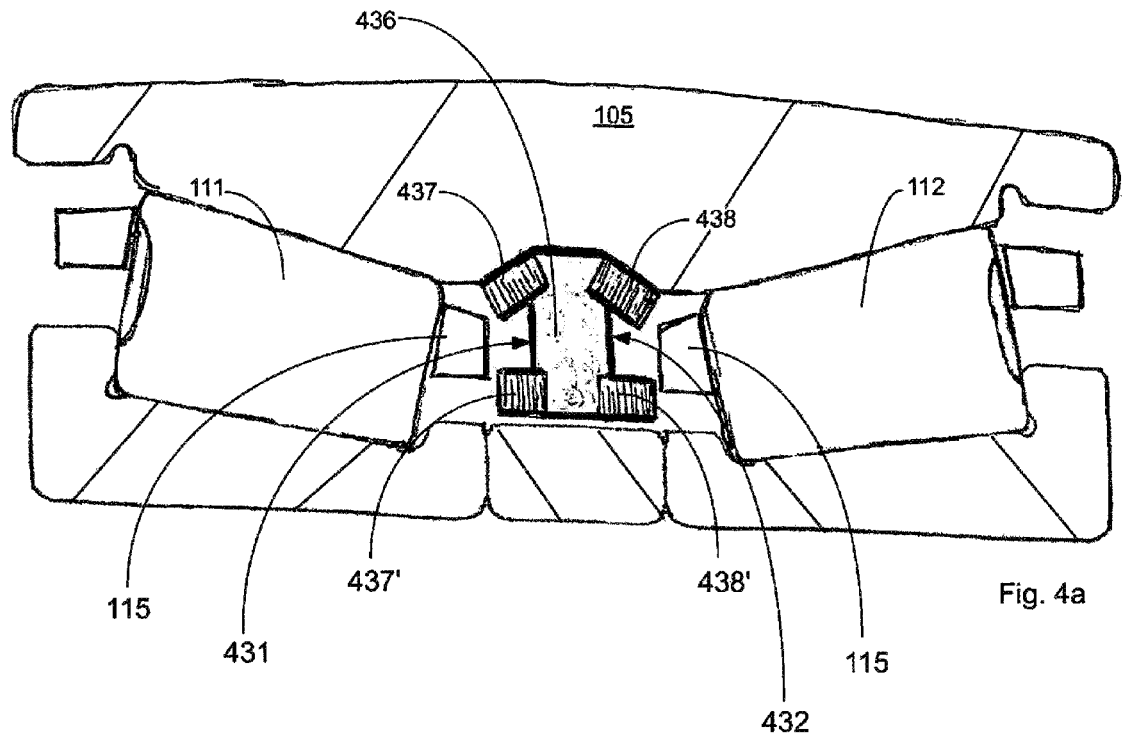
FIG. 4a shows a part cross-sectional view of a fourth example bearing assembly according to the invention.
Figure 4B:
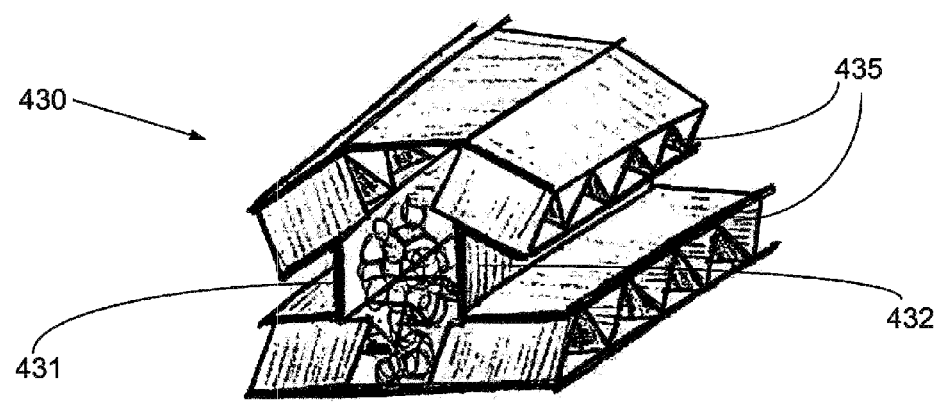
FIG. 4b shows a perspective view of a section of the grease cartridge.

In a further embodiment of a bearing assembly according to the invention, the grease cartridge is mounted to the outer ring of the bearing and is non-rotational in use. One example is shown in FIG. 4a, while FIG. 4b shows a perspective view of a section of the grease cartridge. The grease cartridge 430 is mounted to a recess in the outer ring 105 of a double-row taper roller bearing, between the first and second roller sets 111, 112. The grease cartridge comprises an enclosed cartridge cavity 436 that is filled with a grease lubricant. The cartridge further comprises honeycomb structures having axial passageways 435 that form first axial extensions 437, 437' that extend from the from the first side wall 431, and further form second axial extension 438, 438' that extend from the second side wall 432. In this example, the radially outer first and second extensions 437, 438 slope towards the bearing axis of rotation, thereby enabling gravity to play a role in releasing lubricant from the passageway openings that are arranged just above the cage 115.

Figure 5:
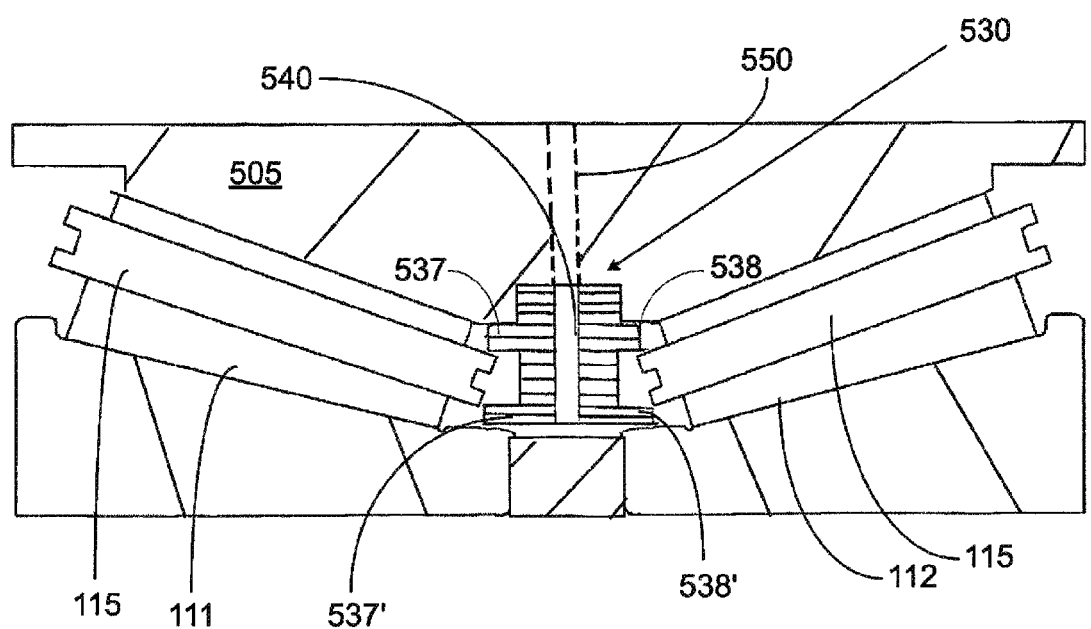
FIG. 5 shows a part cross-sectional view of a fifth example bearing assembly according to the invention.

A further example of a bearing assembly according to the invention is shown in FIG. 5. Again, the grease cartridge 530 is mounted to the bearing outer ring 105 of a double-row taper roller bearing, between the first and second roller sets 111, 112, and is non-rotational in use. The grease cartridge in this example has a similar structure to the grease cartridge of FIG. 1a, and has a honeycomb structure with axially extending passageways parallel to the bearing axis of rotation. Further, the cartridge has first axial extensions 537, 537' and second axial extensions 538, 538' formed from passageways of the honeycomb structure. In this example, the honeycomb structure has first and second sections that are separated by a number of radially extending channels 540. Each cartridge channel 540 is in communication with a channel 550 provided in the outer ring 505, to enable the cartridge to be refilled with grease.

The grease provided in the grease cartridge 530 may be have a lower stiffness than the bearing grease provided in the bearing cavities, so that the grease flows more easily when heated up due to thermal conduction from the honeycomb structure. Alternatively, the grease in the cartridge may have the same stiffness as the bearing grease, and comprise the same base oil, but may be a grease with a higher oil bleed rate. Thus, the thermally responsive grease cartridge will create a reservoir of oil in the axial passageways of the honeycomb structure, which is able to creep out of the openings when it is needed most.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A bearing assembly comprising:
   a rolling element bearing having a first row of rolling elements arranged in a first bearing cavity between a first inner raceway and a first outer raceway of the rolling element bearing and a second row of rolling elements arranged in a second bearing cavity between a second inner raceway and a second outer raceway of the rolling element bearing;
   an annular grease cartridge arranged between the first row of rolling elements and the second row of rolling elements,
   wherein the annular grease cartridge is formed from a honeycomb structure having axially extending passageways filled with a grease lubricant, wherein at least some of the axially extending passageways are open towards the first bearing cavity and the second bearing cavity, and
   the honeycomb structure of the cartridge wherein other ones of the axially extending passageways which are closed towards the first bearing cavity and the second bearing cavity and which are in communication with the at least some of the axially extending passageways that are open towards the first bearing cavity and the second bearing cavity by at least one radially extending channel.

2. The bearing assembly according to claim 1, wherein the honeycomb structure is made from a metallic material.

3. The bearing assembly according to claim 1, wherein the annular grease cartridge is mounted to a rotating part of the bearing assembly.

4. The bearing assembly according to claim 1, wherein the annular grease cartridge is mounted to a non-rotating part of the bearing assembly.

5. The bearing assembly according to claim 1, wherein the rolling element bearing is further lubricated by a bearing grease and the grease provided in the annular grease cartridge comprises a base oil which is the same as the base oil of the bearing grease.

6. The bearing assembly according to claim 5, wherein the annular grease cartridge comprises a grease with a higher thermal bleed rate that the bearing grease, at the same predefined temperature.

7. The bearing assembly according to claim 5, wherein the annular grease cartridge comprises a grease with one of a lower stiffness or a higher stiffness than the bearing grease.

8. A bearing assembly comprising:
a rolling element bearing having a first row of rolling elements arranged in a first bearing cavity between a first inner raceway and a first outer raceway of the rolling element bearing and a second row of rolling elements arranged in a second bearing cavity between a second inner raceway and a second outer raceway of the rolling element bearing; and
an annular grease cartridge arranged between the first row of rolling elements and the second row of rolling elements,
wherein the annular grease cartridge is at least partly formed from a honeycomb structure having axially extending passageways filled with a grease lubricant,
wherein at least some of the axially extending passageways are open towards the first bearing cavity and the second bearing cavity, wherein the annular grease cartridge has a first side wall that faces the first bearing cavity and a second side wall that faces the second bearing cavity the bearing assembly further comprising:
a first axial extension that protrudes from the first side wall towards the first bearing cavity; and
a second axial extension that protrudes from the second side wall towards the second bearing cavity,
wherein the first axial extension and the second axial extension have openings that form axial passageways, which act as a conduit for delivering lubricant, released from the honeycomb structure, to a desired location within the first bearing cavity and second bearing cavity,
wherein the annular grease cartridge further includes a cavity that is enclosed by a top wall, a bottom wall and the first and second side walls of the cartridge, and
wherein the openings in the first axial extension and the second axial extension form a conduit between the cartridge cavity and the first bearing cavity and the second bearing cavity.

9. The bearing assembly according to claim 8, wherein the honeycomb structure is made from a metallic material.

10. The bearing assembly according to claim 8, wherein the cavity of the grease cartridge is filled with one of a grease or an oil lubricant.

11. The bearing assembly according to claim 10, wherein the first axial extension and the second axial extension are formed by axial passageways in the honeycomb structure.

12. The bearing assembly according to claim 8, wherein the honeycomb structure is arranged in the cavity of the grease cartridge.

13. The bearing assembly according to claim 8, wherein the honeycomb structure further comprising axial passageways that slope in a direction towards the rotation axis of the bearing.

14. A bearing assembly comprising:
a rolling element bearing having a first row of rolling elements arranged in a first bearing cavity between a first inner raceway and a first outer raceway of the rolling element bearing and a second row of rolling elements arranged in a second bearing cavity between a second inner raceway and a second outer raceway of the rolling element bearing; and
an annular grease cartridge arranged between the first row of rolling elements and the second row of rolling elements,
wherein the annular grease cartridge is at least partly formed from a honeycomb structure having axially extending passageways filled with a grease lubricant, wherein the annular grease cartridge is mounted to a rotating part of the bearing assembly,
wherein at least some of passageways are open towards the first bearing cavity and the second bearing cavity,
a first inner ring, a second inner ring and a spacer ring arranged between the first inner ring and the second inner ring, wherein the spacer ring comprises a shaped recess and the annular grease cartridge has a base portion that is correspondingly shaped to fit in the shaped recess.

15. A bearing assembly comprising:
a rolling element bearing having a first row of rolling elements arranged in a first bearing cavity between a first inner raceway and a first outer raceway of the rolling element bearing and a second row of rolling elements arranged in a second bearing cavity between a second inner raceway and a second outer raceway of the rolling element bearing; and
an annular grease cartridge arranged between the first row of rolling elements and the second row of rolling elements,
wherein the annular grease cartridge is at least partly formed from a honeycomb structure having axially extending passageways filled with a grease lubricant, the annular grease cartridge is mounted to a non-rotating part of the bearing assembly,
wherein at least some of passageways are open towards the first bearing cavity and the second bearing cavity,
the roller element bearing further comprising an outer ring that is non-rotational in use,
wherein the outer ring comprises at least one channel that extends through the outer ring; and
the grease cartridge further comprises at least one radially extending channel which is in communication with the at least one outer ring channel and with the axially extending passageways of the honeycomb structure.

* * * * *